United States Patent

[11] 3,623,612

| | | | |
|---|---|---|---|
| [72] | Inventor | Franz Ernst |   |
|   |   | Aglasterhausen, Germany |   |
| [21] | Appl. No. | 13,704 |   |
| [22] | Filed | Feb. 24, 1970 |   |
| [45] | Patented | Nov. 30, 1971 |   |
| [73] | Assignee | Chemie und Filter GmbH |   |
|   |   | Heidelberg, Germany |   |
| [32] | Priority | Mar. 8, 1969 |   |
| [33] |   | Germany |   |
| [31] |   | P 19 11 808.2 |   |

[54] FILTER
5 Claims, 2 Drawing Figs.

[52] U.S. Cl. .................................................... 210/356, 210/94, 210/311
[51] Int. Cl. .................................................... B01d 29/14
[50] Field of Search ........................................... 210/311, 349, 356, 448, 452, 94

[56] References Cited
UNITED STATES PATENTS

| 1,156,592 | 10/1915 | Davis | 210/311 |
|---|---|---|---|
| 2,634,862 | 4/1953 | Smith | 210/311 X |
| 3,237,769 | 3/1966 | Humbert | 210/94 |
| 3,326,382 | 6/1967 | Bozek et al | 210/356 |
| 3,382,984 | 5/1968 | Kuss | 210/448 |

Primary Examiner—J. L. DeCesare
Attorney—Wayne B. Easton

ABSTRACT: The invention relates to a filter for pipes of the type used for carrying water for industrial uses. The filter has a filter element which comprises a rigid, cylindrically shaped skeleton frame and a sheet material sieve internally of the frame. The sieve is attached only to the top and bottom portions of the frame and has the property such that it is deformable from a slack state to a tensioned state under the effect of fluid pressure. The sieve has restoring properties which cause damped vibrations thereof during the transition from the tensioned state to the slack state. A transparent collecting container beneath the filter element has a light filtering color or tint for preventing the growth of algae in the container.

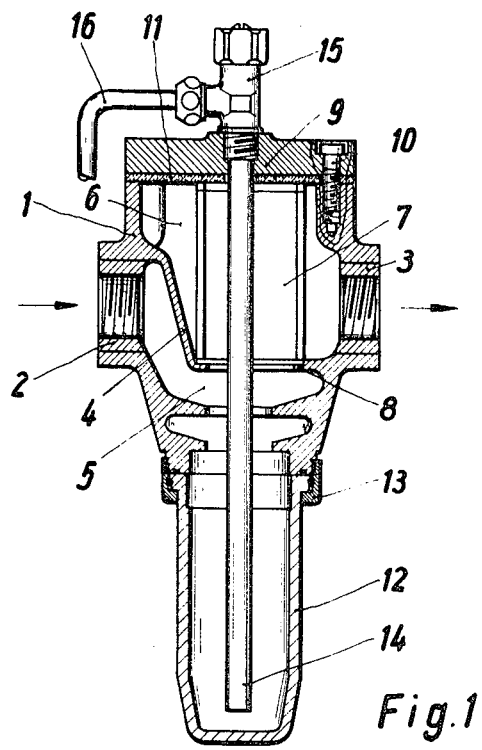
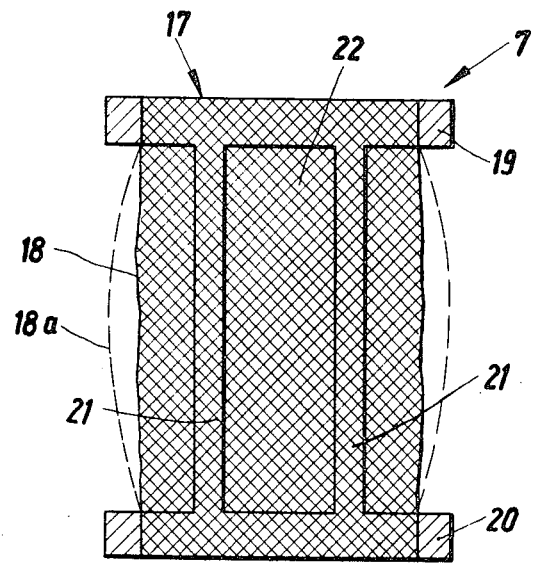

FILTER

The invention relates to a filter for water pipes of the type used for carrying water for industrial use. The filter is of the type having a rigid filter element with an attached sieve and a collecting container arranged below the filter element in such a way that the dirt particles collecting on the inlet side of the sieve can drop into the container.

This type of filter functions to prevent sand, dirt, rust particles, mud crusts, lime, metal chips, etc., from entering valves, circulating pumps or the like and interfering with their operation.

It is well known to provide a filter with a vertical sieve insert and to arrange the collecting container below the inlet side of the sieve. It is also well known to give the sieve surface an inclination of 45°, to allow the water to enter from below, and to provide a collecting container below the sieve surface. In lieu of a plane sieve surface, a cylindrically surfaced sieve having an axis arranged at an angle of 45° to the fluid pipe is also known.

A disadvantage of these prior art filters is that only relatively coarse dirt particles drop automatically into the collecting container while the finer dirt particles remain on the sieve and slowly reduce the effective filter surface. A known solution to this problem is to provide means on the discharge side of the sieve to provide a backward rinsing action for the purpose of cleaning the sieve.

There is also a known prior art filter insert in which a stiff plastic carrier or frame has areas in which a sieve screen is kept under tension. A seamless knitted filter hose is also well known which is tensioned in a longitudinal direction by a spiral spring and which bears on the spiral spring under the effect of an external pressure. The hose can be cleaned by means of a backward rinsing action whereby the hose is caused to bulge in an outward direction under axial contraction and throws off dirt particles in this manner.

It is an object of this invention to provide a filter with which, without a backward rinsing action, the danger of a reduction of the effective sieve surface is considerably less than with known filters.

According to the invention, this object is achieved with a filter of the above-described type in which the filter insert comprises a stiff carrier or frame having at least one open area covered by sieve material. The sieve material is firmly connected to the frame but the center portion thereof is in a slack state until it is deformed to a tensioned state under the effect of fluid pressure.

The sieve generates a self-cleaning effect without a backward rinsing action because the sieve material bulges due to the force of the fluid pressure and then returns to its rest or slack position when the fluid pressure is removed. A large portion of the dirt particles are shaken off the sieve because the return to the rest position takes place quite suddenly. It is especially advantageous when the sieve material has restoring properties such that damped vibrations occur when the fluid is shut off. These vibrations result in an intensive cleaning effect. The filter may also be constructed so that the carrier has several open areas which are covered by sieve material. In this manner, the sieve area is increased without putting too high a load on the sieve material which may be a form of netting.

A special advantage is obtained with a cylindrically shaped filter insert arranged above a collecting container having a vertical axis. In this arrangement the carrier may have upper and lower parallel circular rings connected by vertically extending struts. Such a filter insert has a very large filter area, allows the load of the movable sieve material to be relatively low and requires only a very small space for the installation. It is especially advantageous in this respect to have the sieve material fastened to the inside of the carrier so that it is pressed in the edge area against the circular rings and struts by fluid pressure.

For the production purposes it is advantageous to form the carrier as an extruded plastic part and connecting the sieve material thereto during the extrusion process. For this purpose the sieve material needs only to be placed into the extrusion mold before the extrusion operation begins.

Another advantage of the invention is that the filter insert may be installed in such a way that it is protected against light. In the absence of light algae cannot grow and settle on the rigid parts of the filter insert and thus cause clogging of the sieve. Also, due to the self-cleaning feature it is not necessary to inspect the sieve in order to determine its degree of contamination.

The growth of algae is also prevented if the collecting container is transparent and tinted with a color. A red color is especially suitable for this purpose. However, a blue, green or yellow color may also be used. This transparency allows an inspection to determine how much dirt has accumulated.

A further feature is a pipe which extends through the filter insert and extends to the bottom of the collecting container. The pipe is provided with an external outlet and valve. When the collecting container is to be emptied it is only necessary to open the shutoff valve. The dirt is then pushed from the collecting container into the pipe and from there into the outlet by the force of the inflowing fluid. The opening and closing of this valve is the only operation necessary for the maintenance of the dirt filter.

Other objects and advantages of the invention will become apparent from the following specification, drawings and appended claims.

In the drawing:

FIG. 1 is a vertical sectional view of a filter embodying the invention; and

FIG. 2 is an enlarged vertical sectional view of a filter insert of the filter shown in FIG. 1.

The filter shown in FIG. 1 has a housing 1 with an inlet connection piece 2 and a discharge connection piece 3. A dividing wall 4 separates an inlet space 5 from a filter space 6 in which a filter insert 7 is installed between a mounting 8 of the wall 4 and a lid 9. Lid 9 is attached to the housing 1 by means of screws 10 and a gasket 11 is interposed between the lid and the housing. On the lower end there is screwed onto the housing 1 a cup 12 by means of a capscrew 13. The cup 12 consists of red-tinted, transparent plastic material. A pipe 14 leads from the bottom of the cup 12 through the filter insert 7 and through the lid 9 upward to a shutoff valve 15 which is provided with a discharge pipe 16.

The filter insert 7 comprises a carrier 17 and a cylindrically shaped sieve netting 18. The carrier 17 has two parallel circular rings 19 and 20 which are connected with each other by four vertically extending, parallel struts 21. The sieve netting 18 is fastened to the inside of the rings 19 and 20 and is positioned internally of the struts 21. Netting 18 is maintained in a loose or slack state in the area 22 located between rings 19 and 20 as indicated in FIG. 2.

When water flows in through the connection piece 2, the sieve netting 18 takes the shape of 18a, indicated in FIG. 2 as a dashline, due to the force of the water pressure. The sieve netting acts as a filter which removes all dirt particles from the inflowing water which leaves the housing again at the connection piece 3. Since the filter area is quite large, the filter resistance is also very low. As soon as the water pressure is shut off, the sieve netting 18 returns to its normal position rather suddenly whereby dirt particles which accumulate on the sieve netting 18 are rinsed off and dropped into the cup 12.

Depending on the elasticity and restoring properties of the sieve netting, this netting can also swing inwardly past its normal at rest position and thereby increase the "shake-off" effect.

The filter insert 7 is completely protected against light so that algae which might settle at the container 17 cannot multiply. Although the cup 12 is transparent it is red-tinted so that no light, which would make the algae grow, can enter the filter insert 7 from below.

When the collected dirt is to be removed from the cup 12 it is only necessary to open the valve 15. The inflowing water pushes the dirt from the cup 12 through the pipe 14 out into the discharge pipe 16. After closing the valve 15, the filter is ready to be used again.

I claim:

1. A filter for pipes adapted to carry water for industrial use comprising, a rigid skeleton frame defining an internal space and having an opening at the lower end thereof, sieve sheet material disposed internally of said frame and attached only to the opposite ends of said frame with all of said material between said ends being in a state of slackness, and portions of said material between the frame ends being outwardly distendable to a tensioned state under the effect of fluid pressure.

2. A filter according to claim 1 wherein said sieve sheet material has resilience which causes damped vibrations thereof during the transition from its tensioned state to its slack state.

3. A filter according to claim 1 wherein said frame includes ring-shaped elements at the upper and lower ends thereof, said lower element having an opening for the ingress of water to said internal space.

4. A filter according to claim 3 wherein said frame includes parallel strut members connecting said rings.

5. A filter according to claim 1 wherein said frame is an extruded plastic part and said sieve sheet material is fastened to said frame during the extrusion process.

* * * * *